United States Patent [19]

Bressan et al.

[11] 4,140,912

[45] Feb. 20, 1979

[54] ATMOSPHERIC RADON MONITOR

[75] Inventors: David J. Bressan, Forestville; Reginald E. Larson, Oxon Hill, both of Md.

[73] Assignee: The United States of America as represented by the Secretary of the Navy, Washington, D.C.

[21] Appl. No.: 818,709

[22] Filed: Jul. 25, 1977

[51] Int. Cl.² .................... G01N 21/24; G01J 1/42
[52] U.S. Cl. ..................................... 250/435; 250/394
[58] Field of Search ............... 250/379, 380, 394, 432, 250/433, 435

[56] References Cited

U.S. PATENT DOCUMENTS

| | | | |
|---|---|---|---|
| 2,892,091 | 6/1959 | Sawle | 250/435 |
| 2,972,678 | 2/1961 | Anton | 250/380 |

*Primary Examiner*—Alfred E. Smith
*Assistant Examiner*—Janice A. Howell
*Attorney, Agent, or Firm*—R. S. Sciascia; Philip Schneider; William C. Daubenspeck

[57] ABSTRACT

Apparatus for monitoring the radioactivity of airborne particulate matter by automatically and continually filtering discrete samples of air to collect the airborne particulate matter on a filter tape and automatically detecting, counting and recording the beta emissions therefrom to determine the atmospheric radon concentration.

8 Claims, 4 Drawing Figures

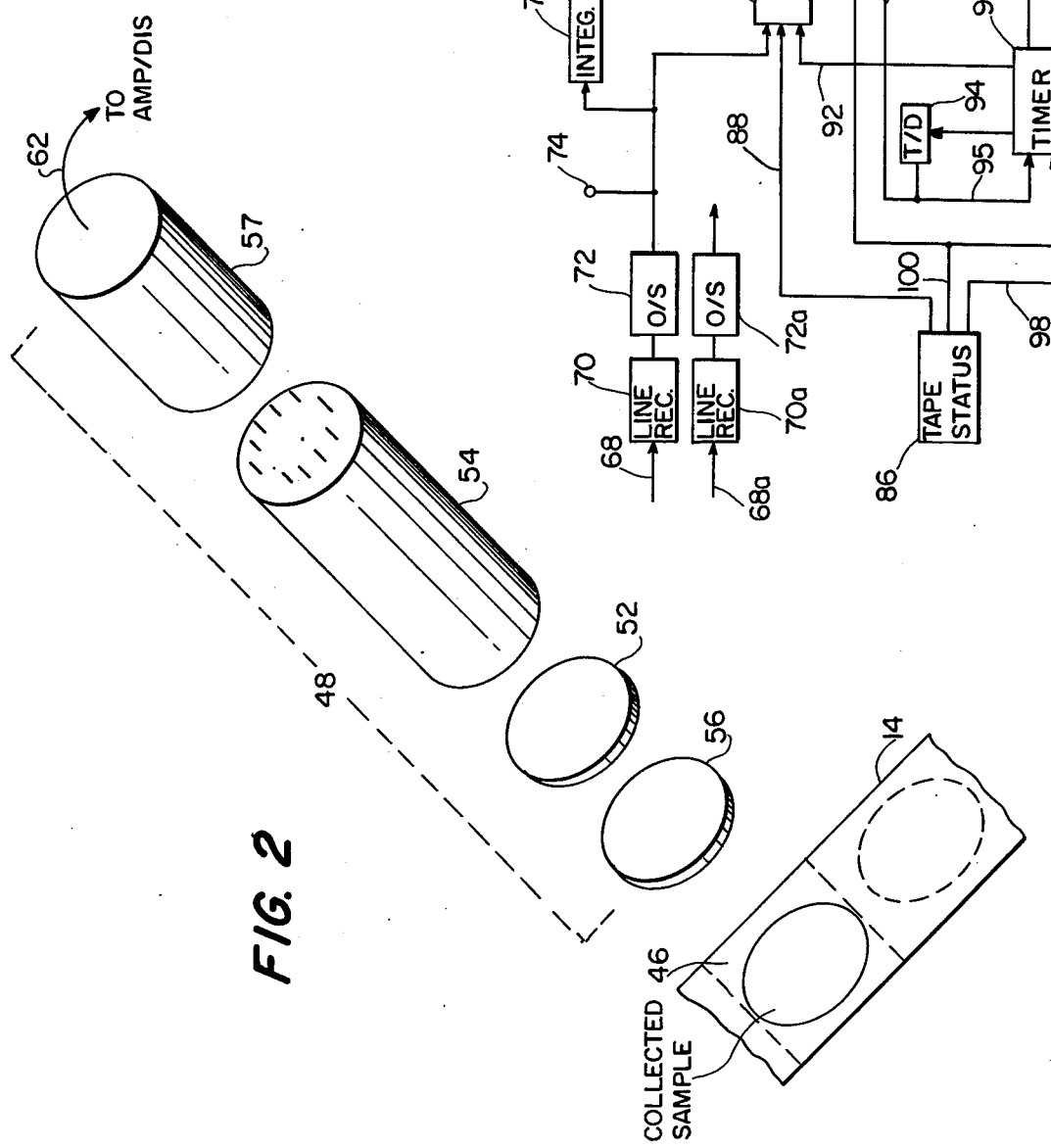

ATMOSPHERIC RADON MONITOR

BACKGROUND OF THE INVENTION

This invention relates in general to atmospheric physics and chemistry studies, especially those studies relating to the transport of continental gases and particulates. In particular, this invention relates to apparatus for monitoring the concentration of radon gas in airborne particulate matter.

Atmospheric investigations at sea have shown that the composition of the near-surface air changes rapidly and that radon ($^{222}$Rn) is a good indicator of the recent continental history of oceanic air masses. Radon gas concentrations can be used to indicate short-term variations in atmospheric composition due to the origin and nature of the air and weather phenomena. They may also be used to study the continental contribution to the atmospheric characteristics in coastal or oceanic areas and to determine air-mass transit times, and have been suggested as being useful in earthquake prediction.

Although radon exists as a gas at ordinary temperatures, airborne radon decays to produce solid radioactive decay products accompanied by corresponding emission of alpha, beta, and gamma radiation, the decay products of radon being generally referred to as "radon daughter products". Since radon and its daughter products are generally assumed to be in equilibrium in the air and the daughter products generally attach themselves to particulate matter, the daughter products may be collected by filtering the particulate matter from the air. Assuming that radon and its daughter products are in equilibrium, the radon content of the air may then be determined by monitoring the emissions produced by the decay of the daughter products. In particular, the beta emissions from radium B ($^{214}$Pb) and radium C ($^{214}$Bi) may be utilized to determine atmospheric radon concentration.

In general, prior art methods of monitoring the radon concentration are of two types. In the first type individual samples of the aerosol particles are collected on a section of filter paper and the single section is manually transferred to a detection device to determine the radioactive content. In the second type, the continual build up and decay of radioactivity on a single section of filter paper is monitored. The former method provides time resolution as good as desired for concentration resolution on the order of a few picocuries per cubic meter (pCm$^{-3}$), but requires extensive personnel, particularly for round-the-clock operation. The latter method enables unattended monitoring for a day or more depending on the load build-up on the filter, but exhibits poor sensitivity for time or concentration resolution since rapid decreases in concentrations are masked by the effective half-life (approximately one hour) of the radon daughter products. Other prior art methods, such as double filtering, or collecting radon on activated charcoal with subsequent direct measurement, provide good sensitivity but require extensive personnel time and the data are not available until some time after collection.

It is desirable to be able to monitor radon concentrations on the order of a few picocuries per cubic meter for trace gas measurements and with time scales on the order of a few minutes to detect the arrival and measure the extent of different air masses or frontal systems over oceanic areas. The frequent measurements are necessary to help understand atmosperic phenomena such as the scale of turbulent eddies, aerosol distributions and the onset of fog. Short-term, real-time radon concentration data can also be used to optimize other experiments, such as finding the best start and stop times for longer-term experiments or sample collections. For example, this may be done to restrict these samples to one air mass or to a single frontal passage.

SUMMARY OF THE INVENTION

An object of the present invention is to provide a radon monitoring system that will monitor short-term variations in atmospheric radon concentration.

Another object of the present invention is to provide a radon monitoring system that may continually monitor the atmospheric radon concentration by automatically collecting discrete samples of airborne particulate matter and automatically detecting, counting, and recording the beta radiations emitted therefrom.

A further object of the present invention is to provide an automatic radon monitoring system in which the sample collection means and the radiation detection means are located remotely from the counting means and data-recording means.

The present invention includes an air receptacle means having an inlet section and an outlet section through which air is periodically drawn. A filter tape on a moveable tape transport is interposed between the inlet section and outlet section of the air receptacle means for collecting the particulate matter. Means are provided for periodically advancing the particle-bearing area of the filter tape away from the collection position to a detecting position. This also brings a fresh area of the filter tape to the collection position. The beta radiation emitted from the particle-bearing area is detected by plastic scintillator/photomultiplier tube detectors which supply the signals to counting means and recording means to determine the atmospheric radon concentration.

BRIEF DESCRIPTION OF THE DRAWINGS

FIG. 2 is an exploded view of a radiation detector utilized in the present invention;

FIG. 3 is a block diagram illustrating the counting and recording means of the present invention.

DESCRIPTION OF THE PREFERRED EMBODIMENT

Figure 1:
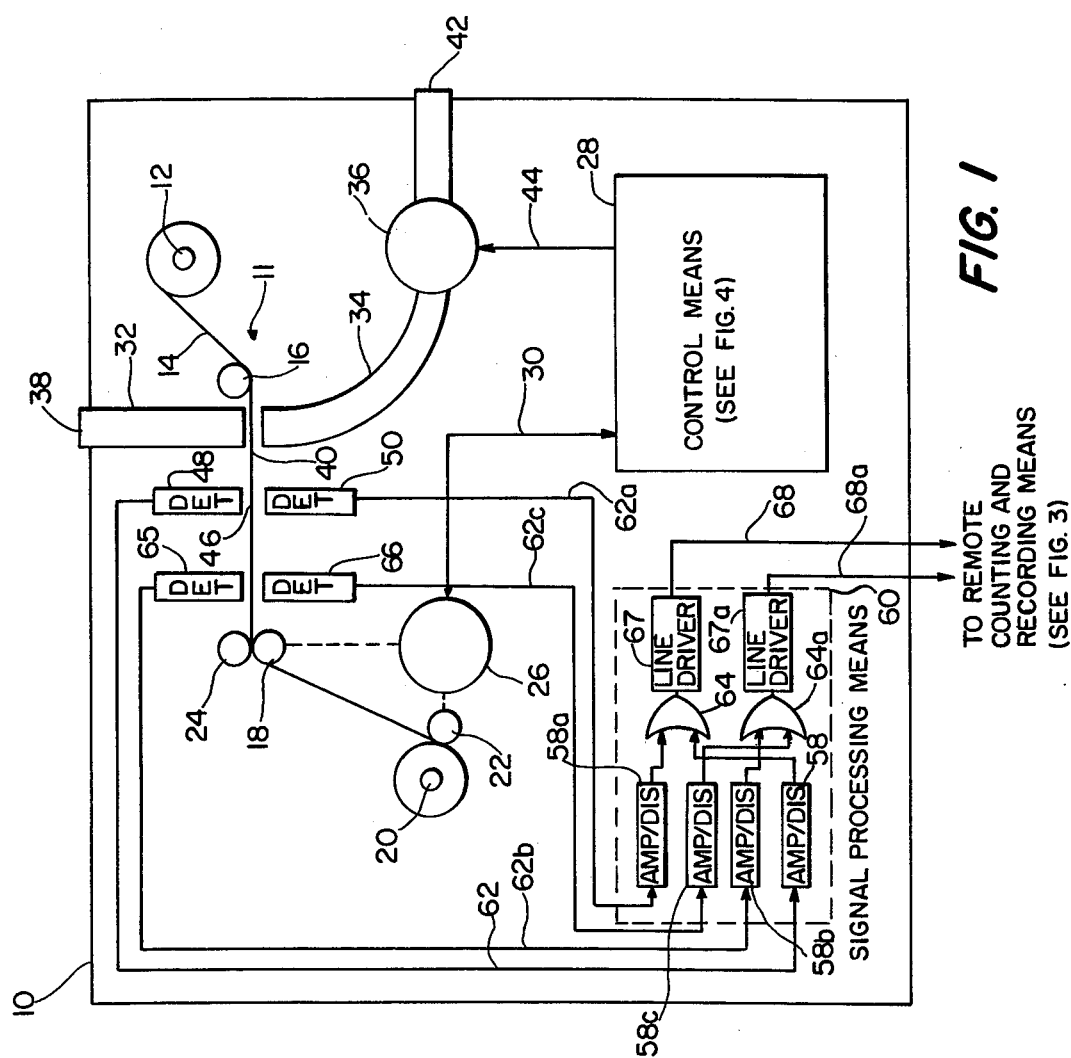
FIG. 1 is a partially pictorial, partially block diagram of the major components of the present invention.

Referring now to the drawings wherein like reference characters designate like or corresponding parts throughout the several figures and, more particularly to FIG. 1, an atmospheric radon monitor according to the present invention includes a weather resistant case 10 which houses a moveable collector means, such as a tape transport, shown generally at 11 for collecting airborne particulate matter. The tape transport 11 includes a feed spool 12 for holding a supply of filter tape 14, a guide roll 16, and a feed drive roller 18 for drawing a metered length of tape from spool 12 toward a take-up spool 20. A tape guide (not shown) may be used to position the tape 14 as it passes between the guide roll 16 and the feed roll 18. The filter tape 14 is fed from the feed spool 12, below the guide roll 16, over feed roller 18, and to the take-up spool 20, whose outer surface is driven by a take-up drive roller 22. The tape is gripped between the feed drive roller 18 and a spring-loaded pressure roller 24 so that the rotation of the feed drive roller pulls the filter tape 14 from the feed spool 12.

The feed drive roller 18 and take-up drive roller are mechanically coupled to a drive means 26, such as an electric motor, which is periodically energized to rotate the drive rollers to effect the drawing of a predetermined length of filter tape 14 from feed spool 12. A control means 28, coupled to the motor 26 via line 30, controls the operation of motor 26 and thereby controls the advance of the filter tape 14.

An air receptacle having an inlet tube 32 and an outlet tube 34 forms an airflow path through which a blower 36 periodically draws air at a predetermined, known, volumetric flow rate. The air receptacle is disposed within case 10 so that outside air is drawn through inlet opening 38 of inlet tube 32 to the surface of the filter tape 14 at a sample collection position 40. The air is drawn through the filter tape 14 which collects the airborne particulate matter, and is discharged through outlet tube 34 into the outside air through opening 42. The control means 28 controls the operation of the blower 36 via line 44.

It is noted that if the radon monitor is intended to operate in all types of weather it is desirable to shield the inlet opening 38 in a manner which will allow the intake of the outside air while protecting the filter tape 14 from adverse weather conditions such as rain. It is further noted that periods of high humidity may adversely affect the performance of the filter tape 14 (particularly if a paper filter tape is utilized) by weakening the tape or altering its particle collection characteristics. Therefore, the preferred embodiment includes a shield (not shown) to protect the inlet opening 38 from adverse weather conditions and means for keeping the sample collection position of the filter tape dry. A 100 watt light bulb (not shown) has been found to be suitable for drying the filter tape during times of high humidity.

After an appropriate collection period, the blower 36 is deactivated and the filter tape 14 is advanced (both operations being under control of control means 28) so that the sample collected at the sample collection position 40 is moved to a detection position 46 between a first set of detectors 48 and 50.

FIG. 2 is an exploded view of detector 48 (detector 50 is identical to detector 48) which includes a thin, plastic scintillator 52 which is optically joined and physically bonded (with suitable epoxy) to a photomultiplier tube 54. Nuclear Enterprises Model Pilot B and a Dumont 6292 are suitable for use as scintillator 52 and photomultiplier tube 54, respectively. The sensitive area of the scintillator-photomultiplier is shielded from light and alpha particles by covering the end of the detector with two layers of thin (0.00254 cm) aluminum foil 56. The foil 56 may be attached by tape (not shown) such as Scotch No. 33 which also serves as a light shield. The thin plastic scintillator 52 will, when struck by a beta particle, emit sufficient light for detection by the photomultiplier tube 54. However, the scintillator has so little volume that the background counting rate from cosmic rays and other natural radiations is sufficiently small to enable detection and measurement of low radon concentrations. Photomultiplier tube 54 produces electrical signals in response to the light emitted from the scintillator in response to the beta radiation.

A tube base preamplifier 57, such as a Canberra Model 802-9, distributes power to and transforms the electrical signals from the photomultiplier tube 54 into a suitable shape for local transmission via line 62 to an amplifier/discriminator 58 located in a signal processing means 60 (as shown in FIG. 1). The amplifier-discriminator serves to amplify the detector's response and discriminates between the detector's response and system noise, thereby shaping the output signals provided by the preamplifier 57 so that they may be utilized by conventional counting circuits.

Similarly, signals from detector 50 (specifically from a preamplifier which is not shown) are coupled to an amplifier discriminator 58a via line 62a. The outputs of amplifier/discriminators 58 and 58a are fed to an OR gate 64 where they are combined. It should be noted both detectors 48 and 50 are not required (detector 48 being the primary detector because it is located in the top side of the filter tape which should contain the majority of the particulate matter). The use of detector 50 on the opposite side of the sample serves to increase the statistical accuracy obtainable by approximately doubling the solid angle within which beta radiations may be detected.

The preferred embodiment includes a second set of detectors 65 and 66 (identical to detectors 48 and 50) which are disposed a distance of two tape increments away from the first set of detectors 48 and 50. Detector 65 and 66 are likewise coupled to amplifier/discriminators 58b and 58c, respectively, and the outputs of these amplifiers/discriminators are combined in an OR gate 64a. Detectors 65 and 66 are positioned to measure the radioactivity of the collected sample a period of time after it has been measured by detectors 48 and 50, thus providing additional data on the radon concentration. The data from the second set of detectors may be used to make half-life estimates for determining the extent of equilibrium between the radon and its daughter products or to detect washout of radon daughter products from the air or residual radioactivity not related to recent $^{222}$Rn decay.

For the simplest system, counters and recorders could be attached directly after the OR gates 64 and 64a and included within the case 10. However, the preferred embodiment described herein is intended to operate in a hostile environment (such as a marine environment on the deck of a ship), where it is preferable not to unnecessarily maintain delicate equipment. Therefore the signals from OR gates 64 and 64a are coupled to differential line drivers 67 and 67a, respectively, which transmit the signals to a remote counting and recording means through shielded twisted pairs (indicated by lines 68 and 68a, respectively).

FIG. 3 illustrates the counting and recording means of the preferred embodiment of the present invention. Two differential line receivers 70 and 70a decode the outputs of the differential line drivers 68 and 68a, respectively, and the decoded signals are transformed into uniform output pulses by one-shot circuits 72 and 72a. These output pulses from 72 correspond to the beta radiations detected by the first set of detectors 48 and 50 and the output pulses from 72a correspond to the radiation detected by the second set of detectors 65 and 66. The processing of the output pulses from one-shot circuit 72 will now be described with reference to FIG. 3. It is noted that the output pulses from one-shot 72a are processed in the same manner as those from one-shot 72 although the apparatus is not shown in FIG. 3.

The output pulses from one-shot 72 are made available for any purpose at a connector 74 and are also coupled to an integrator 76 that is adapted to provide suitable signal transformation for display on a strip chart recorder 78. In the preferred embodiment the primary recording is in the data bank of a computer (not shown). In order that only valid data is stored in the computer, the output pulses are coupled to a counter 80 via an AND gate 82 which also receives inputs from a tape-status indicator 86 (not shown in FIG. 1) (via line 88) located on the tape transport 11 and from a counting interval timer 90 (via line 92). The tape-status indicator 86 provides a logical "one" signal while the tape is stopped and the counting interval timer 90 provides a logical "one" while the timer is running so that the pulses are passed by the AND gate 82 to the counter 80 only for a specific time interval (determined by timer 90) and while the tape is stationary. When the counting interval has been completed, a signal from the timer 90 is sent to a time delay 94, which in turn (after an appropriate delay) sends a signal on line 95 to restart the timer and on line 96 to reset the counter 80 in preparation for a second count.

The tape-status indicator 86 also provides a pulse on line 98 when the tape starts moving and a pulse on line 100 when the tape stops moving. As OR gate 106 enables the counter 80 to be reset by either the stopping of the filter tape (line 100) or the starting of the counting interval timer 90 by the time delay 94. Another OR gate 108 enables the recording of the radon data in the computer when either the proper time interval has been completed (line 102) or when the filter tape starts to move (line 98 from tape-status indicator 86). Data in the counter 80 may also be displayed visually at 104 if desired.

The control means 28 controls and coordinates the operation of the blower 36 and the tape drive means 26 (electric motor) to provide automatic, unattended operation of the radon monitor. Specifically, the control means activates the blower 36 for a selected period of time in order that the particulate matter may be collected from an appropriate volume of air. After the blower has been in operation for the appropriate time, the control means will deactivate the blower, and activate the electric motor 26 so that the collected sample is transported to the detection position 46, between detectors 48 and 50.

In the preferred embodiment, twelve minutes (1/5 hour) was selected as the basic period of operation. This basic period has been found to be useful for monitoring radon concentration in a marine environment, and is noted as an example and not intended to limit the present invention. This permits a ten-minute sample collection time and two minutes between samples to allow adequate time for tape transport and to ensure that the filter tape remains in the detector position for a full counting period (determined by the counting interval timer 90 as described herein in connection with FIG. 3 and set to 10 minutes in this embodiment). After a sample is collected, it is advanced to a position between the detectors for counting, and a new sample is collected while the previous sample is being counted.

Figure 4:
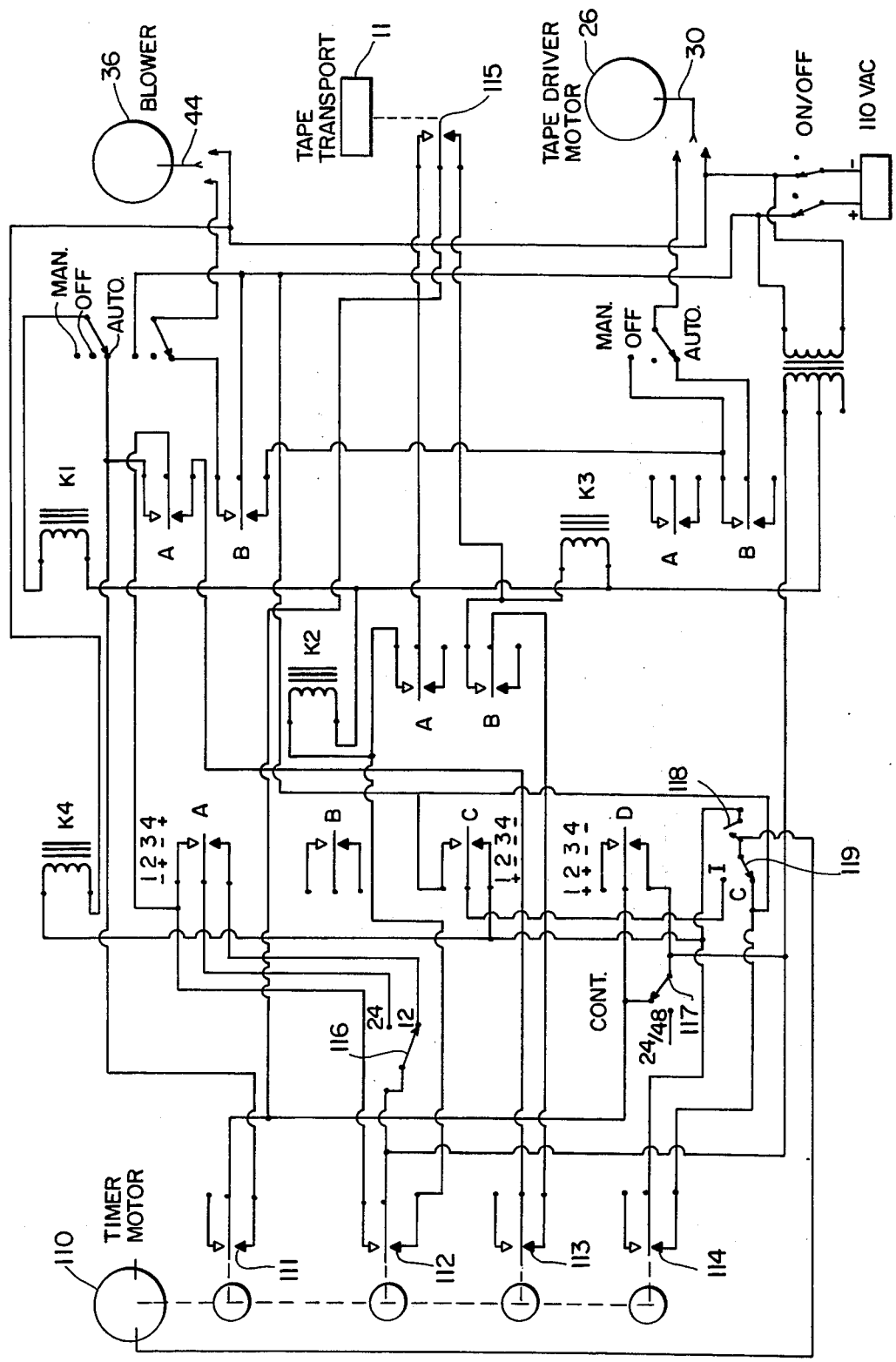
FIG. 4 is a schematic drawing of a circuit which controls automatic operation in an operable embodiment of the present invention.

Referring now to FIG. 4, the control means 28 there shown provides automatic operation in an operable embodiment of the present invention. An electromechanical timing device having a timer motor 110 and four cam-actuated timed switches 111–114 provides the basic timing cycle. Precision Timer Company of Westbrook, Connecticut, Model D-150-4, M-13, G-48 timer was used as the timing device in the operable embodiment. Control means 28 also includes three double-pole, double-throw relays K1–K3 (each relay having 2 sets of contacts identified as A and B) and a four-state, four-pole double-throw stepping relay K4 (having 4 sets of contacts identified as A, B, C, and D). In the operable embodiment, relay K4 is an AP series, 4 PDT (form C) (110 VAC actuating voltage) and relay K1–K3 are GF series (6 VAC actuating voltage) manufactured by Potter and Brumfield.

In FIG. 4, the switches 111–114 are drawn so that the normally closed contacts are shown below the normally open contacts and are further identified by solid arrowheads. The cam actuation allows the normally closed contacts to close during the actuation period. The positions of each set of contacts (A, B, C, D) of relay K4 in its four states (1, 2, 3, 4) are identified by a plus sign (+) indicating that the lower contact is closed and a minus sign (−) indicating that the upper contact is closed. For example, the upper contact of K4-A is closed in states 1 and 3, and is open in states 2 and 4 (as indicated by $$\begin{array}{cccc}1 & 2 & 3 & 4\\ - & + & - & +\end{array}$$

in FIG. 4).

The basic radon monitoring cycle is initiated when the timing motor 110 (having a 12 minute cycle) closes the normally closed contact of switch 111 for approximately 0.2 minutes (11.8 minutes after start of the proceding cycle) through cam actuation. Switch 111 activates relay K1 causing the blower 36 to be energized via relay contact K1-B. As contact K1-B is connected to be self-latching through contact K1-A, the blower 36 remains energized even though switch 111 is returned to its normal (unactuated) position (at 0.0 minutes). At approximately 10.0 minutes in the cycle, the normally open contact of switch 112 is opened for 0.3 minutes. This deactivates relay K1 by disconnecting the activating voltage that was supplied via contact K1-A. (The blower 36 is thus de-energized.)

The initial activation of relay K2 occurs during the brief internal that switch 112 changes state to de-energize the blower 36. However relay K2 will remain latched (after switch 112 returns to its normal state) only if the tape transport 11 is not moving (i.e., not being driven by electric motor 26). A switch 115, responsive to motion of the tape transport 11, supplies power to keep relay K2 latched if the tape transport is not moving.

As the timing cycle of timing motor 110 continues, the contacts of switch 113 are changed to their actuated position at 10.8 minutes and remain in that state until 11.2 minutes. If relay K2 is latched (and it will be if the tape transport is not moving), relay K3 will be activated by switch 113 during this period, and the electric motor 26 will be energized via relay contacts K3-B. As the motor 26 advances the filter tape, switch 115 changes state, simultaneously keeping relay K3 activated but allowing K2 to unlatch. At the end of the proper tape increment, switch 115 returns to its former state and deactivates relay K3, thereby stopping the electric motor 26. Relay K3 can no longer be activated by switch 113 (even though switch 113 has not yet returned to its unactuated position) since relay K2 has become unlatched.

Thus it can be seen that relay K2 acts as a logical element allowing the tape transport to increment only if (a) switch 112 has cycled to unlatch K1, (b) the blower is actually de-energized and relay K1 is in its unactivated state which supplies power to switch 113 through contacts K1-A, and (c) switch 115 supplies power to energize relay K2.

The control means 28 as thus far described provides the basic timing cycle. However, the operable embodiment shown in FIG. 4, through the use of cam actuated switch 114, switches 116–117, and relay K4 provides alternative cycles. Switch 116 and relay circuit K4-A serve to lengthen the runing cycle from twelve to twenty-four minutes. Since switch 112 opens every twelve minutes, the blower 36 would deenergize each time. However, when switch 116 is set to at "24", relay K1 is kept latched through circuit K4-A, when K4-A is (−) at states 1 and 3, thus providing 22 minutes of sampling time. Also when relay K1 stays latched, switch 113 receives no power so the filter tape will not increment.

Switch 117 and relay circuit K4-D provide power to the blower energizing circuit of switch 111. Relay K4-D provides power during states 1 and 2 or for 24 minutes out of 48 when switch 117 is set to the position labeled "24/48". However, when switch 117 is set to the position labeled "cont." in FIG. 4, relay K4-D is shunted to provide continuous power for more frequent blower energizing such as every 12 minutes when switch 116 is set to "12" or every 24 minutes when it is set at "24".

The combinations available through switches 116 and 117 are one 10 minute sample every 12 minutes, or one 22 minute sample every 24 minutes, or one 22 minutes sample every 48 minutes, or two 12 minutes samples, followed by two 12 minute rest periods every 48 minutes.

The stepping relay K4 is controlled by the cam actuated switch 114 and momentary contact switch 118. An associated switch 119 and relay K4-C control the timing motor 110. When switch 119 is set at "C", continuous operation of the circuit results. However, when switch 119 is set at "I", K4 will step to the first state, and relay K4-C will now obtain timing motor driving power from relay K4's activating circuit. The timing motor will continue to run until it opens switch 114 at 11.7 minutes in the cycle (switch 114 being closed at 11.4 minutes). At that time all equipment is de-energized and the timing motor 110 and relay K4 are synchronized to begin a new cycle. Momentary contact switch 118 will step relay K4 around to the desired state if necessary.

Several components and operating characteristics of this embodiment were selected as being suitable for marine radon monitoring. Hollingsworth and Vose Type 56 fiber glass filter paper is one of several that provide high collection efficiency for radon daughter products (70 to 90 percent) while permitting 50 cubic feet per minute flow rates through an area two inches in diameter. The basic 12 minute cycle was selected in combination with the above flow rate to enable resolution of radon concentrations as low as 0.5 pCim$^{-3}$ within a suitably short time scale. Concentrations as low as 0.1 pCim$^{-3}$ can be measured by extending the sample time to 22 minutes and counting the sample for 40 minutes (four 10 minute counts), giving a 48 minute cycle.

It should be apparent that the atmospheric radon monitor of the present invention may be easily adapted for special purpose such as optimizing other experiments or monitoring radon over land (as has been suggested as a method of earthquake prediction). For instance, sample collection time and the sample collection frequency may be varied according to the needs of a particular use. Provisions could be made for telemetering data from a remote sensing site to a computer, or for activating an alarm when unusually high radon concentrations are detected. It is also noted that the used filter tape is retained on the takeup spool in the preferred embodiment so that collected samples may be analyzed at a later time to obtain additional information concerning the particulate matter collected thereon.

Obviously, many modifications and variations of the present invention are possible in light of the above teachings. It is therefore to be understood that within the scope of the appended claims, the invention may be practiced otherwise than as described.

What is claimed and desired to be secured by Letters Patent of the United States is:

1. Radiation measuring apparatus, for continually monitoring the radioactivity of airborne particulate matter, which comprises:
   air receptacle means having an inlet section and an outlet section;
   means for periodically drawing air into said receptacle means to produce an airstream flowing therethrough;
   collector means interposed between said inlet section and said outlet section for collecting the particulate matter in said airstream, said collector means being movable to collect the particulate matter from the airstream on successive areas thereof;
   means for periodically moving said collector means to remove the particle-bearing areas thereof from said air receptacle means and to bring a fresh area for collection of particles into position between said inlet section and said outlet section, said particle-bearing area being moved to a detection position;
   means for detecting radiation emitted from said particle-bearing area when said particle-bearing area is at said detecting position; and
   means responsive to said detecting means for counting the detected radiation emitted from said particle-bearing area and recording the count thereof.

2. Apparatus as recited in claim 1 wherein said collector means comprises a tape filter and tape transport, the tape being adapted to collect said airborne particulate matter in said airstream.

3. Apparatus as recited in claim 2 wherein said means for detecting is a beta radiation detector.

4. Apparatus as recited in claim 2 wherein said means for detecting radiation comprises a first set of beta radiation detectors, one detector of said first set positioned on each side of said tape at said detecting position.

5. Apparatus as recited in claim 4 wherein said means for detecting further comprises a second set of beta radiation detectors for detecting the radiation emitted from said particle-bearing area at a later time than detected by said first set of detectors, one detector of said second set positioned on each side of said tape.

6. Apparatus as recited in claim 2 wherein said means for periodically operating said collector means comprises drive means for advancing said tape transport and means for periodically energizing said drive means.

7. Apparatus as recited in claim 1 wherein said means for periodically drawing air comprises blower means and means for periodically energizing said blower means for an interval to draw a selectable volume of air through said receptacle means.

8. Apparatus as recited in claim 1 wherein said means for periodically energizing said drive means and said means for periodically energizing said blower means are automatically controlled to provide continuous unattended operation.

* * * * *